Dec. 27, 1949

P. M. BOURDON 2,492,352

CABLE ADAPTED TO FORM THE METAL
CARCASSES OF PNEUMATIC TIRES

Filed Oct. 23, 1947

INVENTOR
PIERRE MARCEL BOURDON
by
Campbell, Brumbaugh + Free
HIS ATTORNEYS

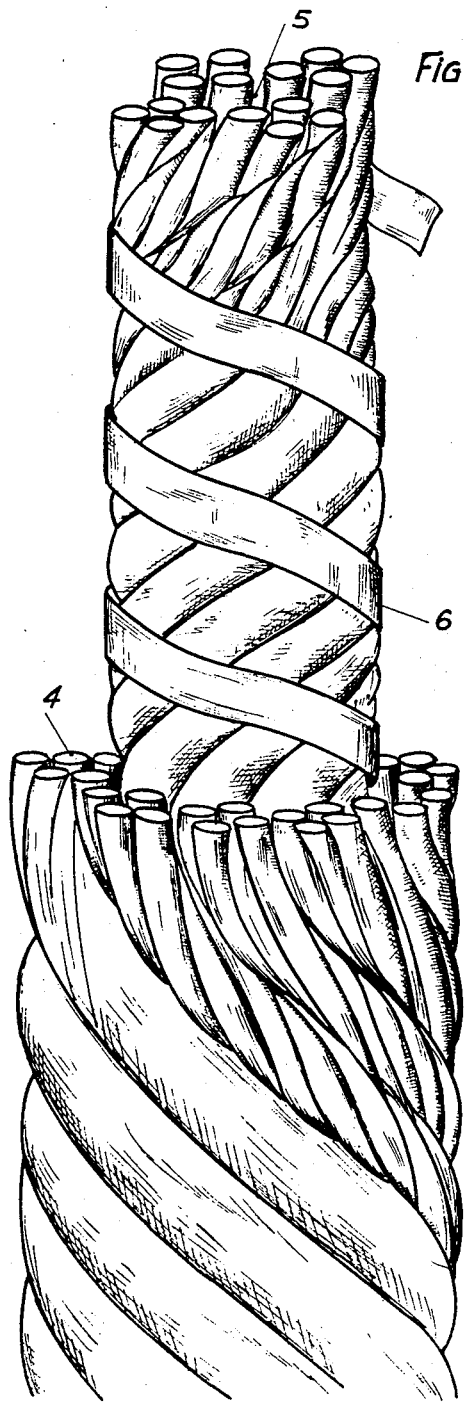
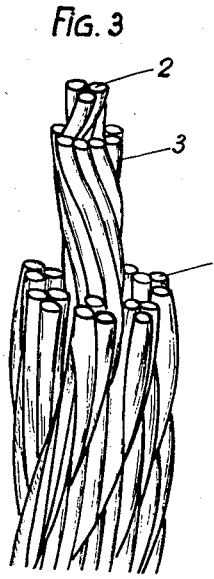

Patented Dec. 27, 1949

2,492,352

UNITED STATES PATENT OFFICE 2,492,352

CABLE ADAPTED TO FORM THE METAL CARCASSES OF PNEUMATIC TIRES

Pierre Marcel Bourdon, Paris, France, assignor to Manufacture de Caoutchouc Michelin (Puiseux, Boulanger et Cie), Clermont-Ferrand, France Application October 23, 1947, Serial No. 781,694
In France July 31, 1947

9 Claims. (Cl. 57—145)

My invention relates to improvements in metal cables of small diameter adapted to form the metal carcasses of pneumatic tires and in particular carcasses of the type disclosed in the Hauvette U. S. Patent No. 2,143,694, dated January 10, 1939.

Pneumatic tire casings have been made heretofore with a reinforcing fabric formed of highly flexible metallic cables, instead of the more common plies formed of textile fibers such as cotton, rayon and the like. Generally, a casing reinforced with metallic cables contains fewer plies and less rubber than a casing of equal strength containing a fabric or textile cord, due to the greater strength of the metal cables. Also, the cable-reinforced casing does not become as hot, in service, as a fabric reinforced tire due to its thinner sidewalls and the greater conductivity of the cables. Casings having metallic cable plies are generally superior to casings containing textile cord or fabric plies under all conditions of operation, and especially on smooth roads or terrain. However, the superiority is not as great when the casing is used on rough, rocky or bumpy roads and terrain. I have discovered that, under such rough or severe operating conditions, the cables in the plies of the casing are subjected to violent axial compression stresses which tend to buckle and spread or separate the wires or strands of the individual cables. In the case of severe stresses produced by striking rocks and the like, the individual wires or strands may be spread apart and actually bent very sharply so that the individual wires and strands are deformed and may be permanently injured. As a result, the physical characteristics of these cables and the resistance to repeated flexing are so diminished that failure of the cables may occur in the vicinity of such sharply bent portions of the wires and strands.

My invention has for its object to prevent such permanent deformation of the cables forming a tire carcass at zones subjected to compressional stresses.

When using cables embodying the invention, the carcass is not modified to any great extent from existing practices. For example, it is unnecessary to increase the rigidity of the beads of the casing which might shift the zone in which the dangerous stresses are produced instead of doing away with them, and might lead to further defects.

The carcasses produced with cables according to my invention are not only capable of resisting the unusual stresses produced when running over an uneven and stony ground, but under normal conditions of high speed running over good roads they give excellent results and their life is very substantially higher than that of standard carcasses.

According to the invention, each cable forming part of the carcass includes two parts:

An outer part that is very deformable and is constituted for instance by a plurality of strands of very flexible, strong steel wire that can withstand repeated flexing, without breaking. These strands are loosely associated to allow the rubber to enter the interior of each strand so that each elementary wire is embedded in said rubber and adheres thereto. The strands are wound into parallel helical lines round the central part thereof.

The cable also includes a central part that is much less deformable but resists any axial stresses and is formed of a plurality of fine, flexible wires that can withstand repeated bending. Preferably these wires are the same as those forming the outer strands. This central part that is much less deformable than the outer part acts as a support for said outer part and prevents any exaggerated deformation thereof that might lead to its deterioration.

The central part may consist of a group of wires or of a strand forming a core around which are wound helically one or more layers of suitable numbers of parallel wires.

The wires wound around the central strand and those forming said central strand are spaced sufficiently to allow the rubber to enter the central strand and between the elementary wires of the latter. In this form of the invention, the wires of the central strand press against the wires wound around said strand when subjected to axial compression so as to avoid any exaggerated stressing and bending of the wires of the central strand.

Alternatively, a plurality of strands are assembled to form a cable, the cable thus formed being surrounded by one or more round or flat parallel wires that are wound helically with a low pitch round the cable. The outermost wires bear loosely against one another and against the cable so as to allow the rubber to flow into the central cable and to prevent the helical sheath imparting excessive rigidity to the central part.

The accompanying drawings illustrate diagrammatically, by way of example, various forms of execution of the invention. In the drawings:

Figs. 3 and 4 are perspective views of the cables shown partly unwound.

In the drawings:

Fig. 1 is a transverse cross-section of a preferred type of cable embodying the invention. The cable includes:

(i) an outer part including nine strands 1 consisting of three steel wires;

(ii) a central part consisting of:

(a) a central strand 2 consisting of three wires having the same diameter as the wires of the outer part;

(b) a layer 3 of nine parallel wires also of same diameter arranged helically round the central strand.

A suitable selection of the direction and length of the pitches of the wires makes it possible to obtain the conditions that are indispensable for the introduction of the rubber into the cable and around the wires and strands thereof, for a high resistance to axial compression and for resistance to repeated flexing.

In a form of cable that has led to particularly satisfactory results and that is illustrated in Fig. 3, the following proportions have been adopted:

The outer strands 1 include each three wires of a diameter of $15/100$ of a mm. arranged helically with a left hand pitch of 5.5 mm.

These outer stands are in their turn laid along helical lines having a right hand pitch of 13.5 mm. round the central part of the cable.

The central part is constituted by:

(a) a strand 2 formed of three wires arranged helically with a right hand pitch of 5.5 mm.;

(b) a layer 3 of nine parallel wires surrounding said strand 2 wound helically with a left hand pitch of 8.5 mm.

This relation of directions of twist and lengths of pitches is by no means imperative and is disclosed only by way of an example that is particularly favorable for the practical application of the invention.

Figure 1:
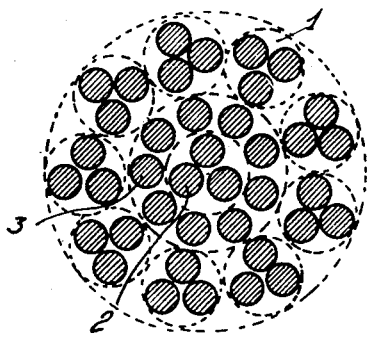
Figs. 1 and 2 are transverse cross-sections of the cables.

Fig. 1 shows more particularly the arrangement of the wires with respect to one another, the empty spaces left between them that are to be filled with rubber when the cable forms the carcass of a tire and the spaces for the rubber to enter the core of the cable.

Examination of sections of cables of the above described type, after removal from a tire casing shows that the rubber has entered the cable up to the three inner wires of the central strand and adheres rigidly thereto.

Figure 2:
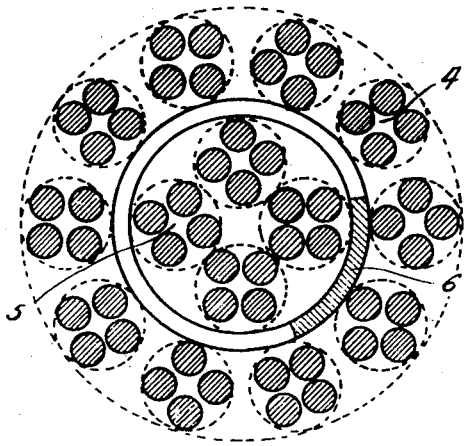

The cable illustrated in transverse cross-section in Fig. 2 consists of:

(i) an outer part including ten strands 4, each containing four steel wires;

(ii) a central part including:

(a) four strands 5 of four wires each combined to form a cable, the diameter of the wires being the same as for the wires forming the outer part. The strands are twisted to dispose them in parallel helical lines round the axis of the cable;

(b) a sheath consisting of a round wire or even a thin flat wire is wound helically round the cable formed by the four strands 5. This sheath bestows on the central part of the cable a high resistance to axial compression. As a matter of fact the strands enclosed inside the helical wire cannot expand or be destroyed by such axial compression.

It is essential that the sheath should not make the central group of strands 5 excessively rigid as this would lead to a reduction in the resistance to repeated flexing of the four strands of the central part.

To satisfy this condition, the sheath wire should not be wound tightly around the four strands. This operation is executed for instance by any method similar to a plaiting method.

The sheath should be pervious so that the rubber can flow through the gaps in it during the vulcanizing of the tire and enter the inner strands so as to surround and to adhere to all of the wires.

A suitable selection of the directions and lengths of the pitches of the different components of the cable makes it possible to attain the indispensable conditions of penetration of the rubber, resistance to axial compression and endurance to repeated flexing.

By way of example, the cable illustrated in Fig. 4 has been made with the following directions and lengths of pitches and has provided excellent results:

The outer strands 4 include four wires having a diameter of $15/100$ of a mm. and are twisted with a right hand pitch of 6 mm.

The outer strands are twisted helically with a left hand pitch of 13 mm.;

The central part of the cable consists of four strands 5, each including four wires having a diameter of $15/100$ of a mm. arranged with a left handed 6 mm. pitch.

These four strands 5 are in their turn twisted helically with a pitch of 8.5 mm.;

A flat wire 6 with a breadth of $30/100$ mm. and a thickness of $6/100$ mm. is wound around the four strands 5 with a left-hand pitch of 1 mm.

Instead of a single wire 6, a plurality of round or flat wires may be used to form a sheath like that formed by the wires 3, as shown in Fig. 3, around the central group of strands 5.

Fig. 2 shows that the area occupied by the cross-section of the wire 6 is much smaller than the area between it and the inner strands 5 and the outer strands 4. This furthers the penetration of the rubber up to and into the strands 5.

The above-described relations of directions and lengths of the pitches of the wires and strands are of course not essential. They are disclosed only as examples of the invention which in practice have produced excellent results under unfavorable conditions.

What I claim is:

1. A cable for metallic carcasses for use in tires including in combination an outer deformable layer of helically wound, coreless, twisted strands of thin highly resistant steel wires that are yielding and adapted to support repeated flexion, the wires of each strand being sufficiently loose to allow the tire rubber to enter easily the strand, and a central part constituted by at least one coreless, twisted strand of thin resisting wires and at least one metal wire wound helically round the last mentioned strand to render said central part resistant to axial compression.

2. A cable for metallic carcasses for use in tires including in combination an outer deformable layer of coreless, twisted strands of thin highly resistant steel wires that are yielding and adapted to withstand repeated flexing, the wires of each strand being sufficiently loose to allow the rubber to enter easily the strand, and a central part constituted by a coreless, twisted strand of thin resisting wires and a plurality of parallel metal wires of a mean pitch of about 9 mm. wound helically round last mentioned strand to render said central part resistant to axial compression.

3. A cable for metallic carcasses for use in tires including in combination an outer deformable layer of coreless, twisted strands of thin highly resistant steel wires that are yielding and adapted to support repeated flexion, the wires of each strand being sufficiently loose to allow the rubber to enter easily the strand, and a central part constituted by at least one coreless, twisted strand and at least one metal wire helically wound in a loose manner with a small pitch round last mentioned strands.

4. A cable for metallic carcasses for use in tires including in combination an outer deformable layer made of nine twisted strands each including three thin highly resistant steel wires adapted to support repeated flexion and associated loosely to allow rubber to enter the strand, and a comparatively rigid central part constituted by a central strand of three twisted thin resistant steel wires and a layer of nine thin steel wires arranged along parallel helical wires round the central strand, the different steel wires having all the same diameter.

5. A cable for metallic carcasses for use in tires including in combination an outer deformable layer made of nine strands each including three thin highly resistant steel wires adapted to support repeated flexion and associated loosely to allow rubber to enter the strand, and a comparatively rigid central part constituted by a central strand of three thin resistant steel wires and a layer of nine thin steel wires arranged along parallel helical wires round the central strand with a pitch of about 9 mm., the different steel wires having all the same diameter.

6. A cable for metallic carcasses for use in tires including in combination an outer deformable layer made of ten helically wound, coreless, twisted strands each of four thin highly resistant steel wires that are yielding and adapted to support repeated flexion and held loosely together to allow the introduction of rubber inside the strands, and a comparatively axially incompressible central part formed of four strands twisted together and each strand being coreless and formed of four wires of about $15/100$ of a mm. in diameter and a sheath surrounding the strands of the inner part inside the outer layer and constituted by a wire thinner than the wires of the strands, said wire being wound along a helical line with a smaller pitch and surrounding loosely the strands of the central part.

7. A cable for metallic carcasses for use in tires including in combination an outer deformable layer made of ten helically wound, coreless, twisted strands each of four thin highly resistant steel wires that are yielding and adapted to support repeated flexion and held loosely together to allow the introduction of rubber inside the strands and a comparatively axially incompressible central part formed of four twisted strands each strand being coreless and consisting of four wires of about $15/100$ of a mm. in diameter and a sheath surrounding the strands of the inner part inside the outer layer and constituted by a round wire of about $6/100$ of a mm. in diameter, said wire being wound along a helical line with a small pitch and surrounding loosely the strands of the central part.

8. A cable for metallic carcasses for use in tires including in combination an outer deformable layer made of ten helically wound strands each consisting of four thin highly resistant steel wires twisted together that are yielding and adapted to support repeated flexion and held loosely together to allow the introduction of rubber inside the strands, and a comparatively rigid central part formed by four strands twisted together, each strand being formed of four wires of about $15/100$ of a mm. in diameter and a sheath surrounding the strands of the inner part inside the outer layer and constituted by a flat wire of about $30/100$ mm. in breadth and $6/100$ of a mm. in thickness wound along a helical line with a smaller pitch.

9. A metallic cable for tire carcasses comprising at least one coreless, twisted strand containing a plurality of metal wires, at least one wire wrapped helically and loosely around said strand to reinforce said strand against axial compression, and a plurality of twisted, coreless strands wound helically around the first-mentioned strand and said one wire, each of the last-mentioned strands containing a plurality of metal wires, and all of the wires being sufficiently loosely associated to permit penetration of rubber between said wires to bond said cable to said tire carcass.

PIERRE MARCEL BOURDON.

REFERENCES CITED

The following references are of record in the file of this patent:

UNITED STATES PATENTS

| Number | Name | Date |
|---|---|---|
| 1,656,669 | Gore | Jan. 17, 1928 |
| 2,022,839 | Austin | Dec. 3, 1935 |
| 2,143,694 | Hauvette | Jan. 10, 1939 |
| 2,277,145 | Pierce | Mar. 24, 1942 |